Jan. 2, 1951     C. B. JAMES     2,536,880
APPARATUS FOR APPLYING PREDETERMINED LOADS
TO OBJECTS FOR TESTING HARDNESS
Filed Feb. 28, 1948     2 Sheets-Sheet 1
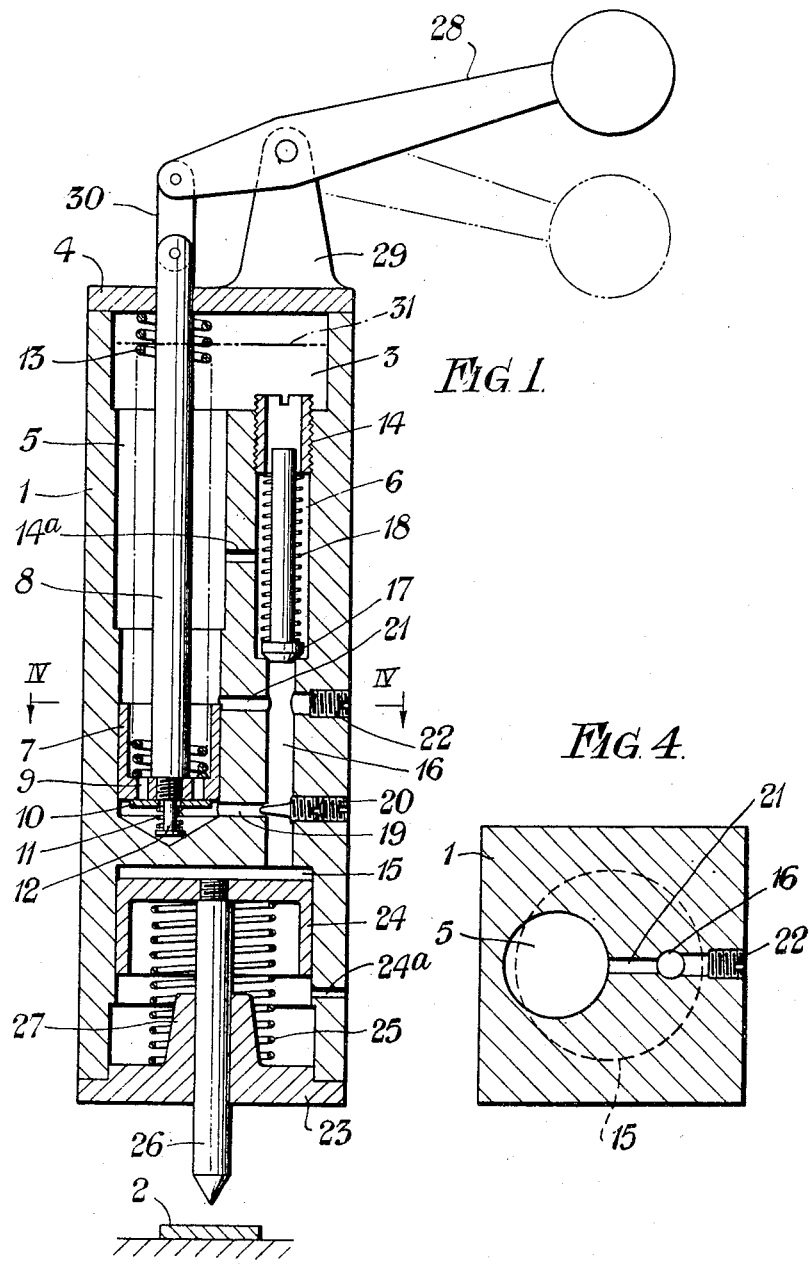
INVENTOR
CECIL B. JAMES
By Haseltine Lake & Co
AGENTS

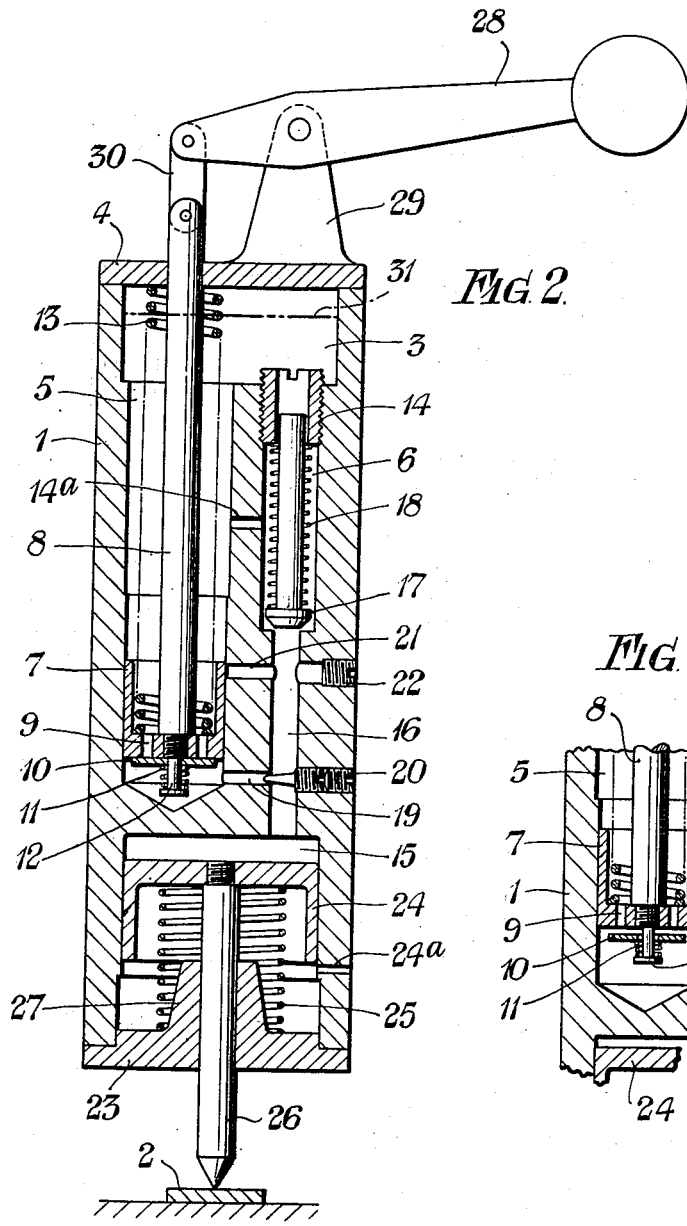
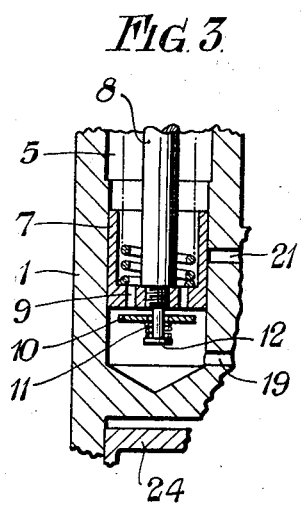

UNITED STATES PATENT OFFICE 2,536,880

APPARATUS FOR APPLYING PREDETERMINED LOADS TO OBJECTS FOR TESTING HARDNESS

Cecil Bertram James, London, England, assignor to Vickers-Armstrong Limited, London, England, a British company Application February 28, 1948, Serial No. 12,084
In Great Britain January 1, 1948

6 Claims. (Cl. 73—81)

This invention relates to an apparatus for applying a predetermined load to an object for testing the hardness of the object or for other purposes and is concerned with the provision of an improved apparatus of this nature which is simple to operate and extremely accurate in use.

Such apparatus may, for example, conveniently be used in conjunction with a diamond or other indenter for ascertaining the hardness of a specimen of metal, the indenter being impressed into the specimen under known load, which is maintained for a period to overcome plastic deformation, and subsequently released.

The apparatus according to the present invention, comprises a loading piston which can be displaced by liquid under pressure to apply the load to the object and an operating piston for applying the pressure to said liquid, the arrangement being such that the said load can be applied, maintained for a predetermined period and then released in a cycle of operations which take place automatically when the operating piston is actuated, the apparatus being again in the starting position at the end of said cycle.

In order that the invention may be clearly understood and readily carried into effect one embodiment thereof will now be described in detail with reference to the accompanying drawings wherein:

Figure 1 is a sectional side elevation illustrating the device in the starting position, Figure 2 is a view similar to Figure 1 illustrating the position of the device during the application of the load to an object under test, Figure 3 is a sectional view of a detail, and Figure 4 is a plan view on the line IV—IV of Figure 1, with certain parts omitted for reasons of clarity.

Referring now to the drawings, a body member 1 is mounted upon any suitable structure (not shown) of sufficient strength to hold the body member rigid whilst a load is being applied to any object 2. The upper end of the body 1 is formed with a recess or reservoir 3 which is closed by a plate 4 secured in position in any convenient manner. The body 1 is also formed internally with two cylindrical chambers 5 and 6 which open into the base of the recess 3.

An operating piston 7 is arranged to reciprocate in the cylindrical chamber 5 and a piston rod 8, the upper end of which extends through the recess 3 and plate 4, is secured to the piston 7. A plurality of apertures 9 extend through the face of the piston from front to rear, these apertures being normally closed by a non-return valve disc 10 which is urged against the working face of the piston 7 by means of a spring 11 mounted on a pin 12. A spring 13 surrounds the piston rod 8 and bears at its lower end upon the piston 7 and at its upper end against the under surface of the plate 4.

A screw-threaded plug 14, having an axial aperture therethrough, is screwed into the upper end of the chamber 6 and the lower end of this chamber is connected to a cylindrical recess 15 in the lower end of the body 1 through a bore 16. The chamber 6 is also connected to the chamber 5 through a small orifice 14a which opens into the chamber 6 approximately mid-way between the upper and lower ends thereof. A relief valve 17, loaded by a spring 18, the upper end of which bears on the under surface of the plug 14, is arranged normally to close the lower end of the chamber 6. If desired this spring 18 could be replaced by a suitable weight. An orifice 19 connects the lower end of the chamber 5 with the bore 16, the opening of the orifice 19 being controlled by a time regulating valve 20 mounted in the wall of the body 1. A further orifice 21, closed at its outer end by a screw plug 22, is formed in the body wall, this orifice serving to connect the bore 16 with the chamber 5 at a point adjacent the upper edge of the piston 7 when the piston is in its lowermost position.

The cylindrical recess 15 is closed by a plate 23 secured on the lower end of the body 1. A loading piston 24 is arranged to reciprocate within the cylindrical recess 15 and a spring 25 bears between the lower surface of the piston 24 and the inner face of the plate 23. A rod 26 is integrally attached to the piston 24, the free end of the rod 26 being arranged to extend through a central aperture in the plate 23 and being guided by a boss 27 formed on the inner surface of this plate. The recess 15 is open to atmosphere through an orifice 24a formed in the wall of the body 1.

A handle 28 is pivotally mounted on a lug 29 secured to the plate 4 and is attached, by means of suitable links 30, to the protruding end of the piston rod 8.

The body 1 is filled with working fluid approximately to the level of the chain-dotted line 31.

In operation, assuming that a known load is to be applied for a predetermined period to the object 2, the handle 28 is depressed from its initial position as shown in full lines in Figure 1 to the position shown in chain-dotted lines and then released. The downward movement of the handle 28 draws the operating piston 7 up the chamber 5 and compresses the spring 13. As shown in Figure 3 the non-return valve disc 10 automatically opens against the action of the spring 11 during the upward movement of the piston 7 and allows the fluid in the chamber 5 to pass through the apertures 9 in the piston 7 and into the lower end of the chamber 5. When the handle 28 is released the spring 13 tends to restore the piston 7 to the initial position shown in Figure 1. The fluid between the working face of the piston 7 and the lower end of the chamber 5 cannot however flow back through the apertures 9 during the downward movement of the piston since these apertures are then masked by the non-return valve disc 10, as shown in Figure 2, so that a pressure is set up which causes the fluid to flow through the orifice 19 past the time regulating valve 20 and into the bore 16, and thence into the recess 15, to transmit pressure equally to the relief valve 17 and the loading piston 24. At this stage the orifice 21 is masked by the piston 7.

As a result of this pressure, the spring 25 is overpowered and the loading piston 24 moves from its initial position as shown in Figure 1 to the position shown in Figure 2 until the lower end of the rod 26 contacts the object 2 upon which it is desired to exert and maintain a known pressure for a predetermined period. As this contact restricts movement of the loading piston 24, and as pressure is still being exerted by the operating piston 7, the pressure on the loading piston 24 and on the relief valve 17 builds up until it reaches a perdetermined value, dependent upon the strength of the spring 18, at which the relief valve 17 lifts against the action of its spring and permits fluid to pass from the pressure side of the system. When the relief valve 17 is open, as shown in Figure 2, the pressure which is still being exerted by the operating piston 7 causes the fluild to continue to flow past the time regulating valve 20 and maintain the predetermined pressure on the loading piston 24 and at the same time causes the fluid to flow past the relief valve 17 into the chamber 6. The fluid flowing into the chamber 6 passes up through the chamber and plug 14 into the recess 3 and also through the orifice 14a directly into the chamber 5 above the piston 7. This continues until sufficient fluid has passed to permit the piston 7 to travel sufficiently far towards its initial position to uncover the orifice 21 in the chamber wall. When this stage is reached fluid can flow freely from the pressure exerting parts of the system. The pressure is thus released from the relief valve 17 which re-seats itself under the action of its spring 18; from the loading piston 24 which assumes its initial position under the action of its spring 25; and from the operating piston 7 which is then fully returned to its initial position under the action of its spring 13. All the parts are therefore brought automatically to their initial positions as shown in Figure 1, at the end of the operating cycle which can be repeated as required by actuating the handle 28. The time taken to complete a cycle of operations can be adjusted by means of the time regulating valve 20.

It should be understood that the apparatus is in no way limited in use to the ascertaining of the hardness of objects and can in fact be applied whenever it is desired to maintain a known load on an object for a predetermined period.

I claim:

1. An apparatus for applying predetermined loads to objects for measuring hardness comprising a body member adapted for mounting in a fixed position relatively to the object under test, a loading piston mounted in a cylindrical chamber in said body member so as to be displaceable therein by liquid under pressure, a light spring of predetermined strength acting on said loading piston to resist said displacement, means for transmitting the load on said piston to the object under test, a cylindrical reservoir for the working liquid, a pressure piston in said reservoir, a pressure spring acting on said pressure piston and having sufficient re-assertive strength to apply said predetermined load against the action of said light spring, the said pressure piston being freely displaceable manually in one direction to stress its spring, which latter, upon re-assertion, is arranged to apply pressure to the liquid in the reservoir, conduit means connecting said reservoir, on the pressure side of said pressure piston, to said cylindrical chamber, said conduit means including a return conduit which connects with the reservoir on the non-pressure side of said pressure piston, a loaded valve controlling said return conduit to limit the liquid pressure on the loading piston to a predetermined maximum, and means, controlled by said pressure piston, for by-passing said control valve at a predetermined point in the stroke of the pressure piston and thereby relieving the pressure in the system so that the moving parts of the apparatus are free to return to their starting positions.

2. An apparatus as claimed in claim 1 further comprising an adjustable regulating valve arranged in the said conduit means connecting the reservoir to said cylindrical chamber, said regulating valve controlling the rate of flow of liquid through said conduit means and thus also the time taken by the apparatus to complete a full cycle of operations.

3. An apparatus as claimed in claim 1 further comprising a piston rod having one end attached to said pressure piston and the other end extending outside the cylindrical reservoir, and a handle member attached to the protruding end of said piston rod for the manual displacement of the said pressure piston to stress its spring and thereby commence a cycle of operations.

4. An apparatus for applying predetermined loads to objects for measuring hardness comprising an elongated body member adapted for mounting in a fixed position relatively to the object under test, a loading piston mounted in a cylindrical recess in one end of said body member and displaceable therein by liquid under pressure, a light spring of predetermined strength acting on said loading piston to resist said displacement, a loading rod connected to said loading piston and extending from said body member for transmitting the load on said piston to the object under test, a reservoir in said body member for the working liquid, a pressure piston in said reservoir, a pressure spring acting on said pressure piston and having sufficient re-assertive strength to apply said predetermined load against the action of said light spring the said pressure piston being freely displaceable manually in one direction to compress its spring, which latter, upon re-assertion, is arranged to apply pressure to the liquid in the reservoir, conduit means in said body member connecting said reservoir, on the pressure side of said pressure piston, to said cylindrical recess, said conduit means including a return conduit which connects with the reservoir on the non-pressure side of said pressure piston, a spring-loaded valve controlling said return conduit, the said spring-loaded valve being subjected to the same liquid pressure as the loading piston and being arranged to open when said liquid pressure overcomes the force exerted by the valve spring whereby the liquid pressure on the said loading piston is limited to a predetermined maximum, and a further conduit connected between said return conduit and the reservoir on the non-pressure side of said piston so as to by-pass said spring-loaded valve, said bypass conduit being controlled by the said pressure piston and serving to relieve the pressure in the system at a predetermined point in the stroke of the pressure piston to allow the moving parts of the apparatus to return to their starting positions under the influence of their respective springs.

5. An apparatus as claimed in claim 4 in which the said pressure piston has at least one axial aperture extending therethrough, a spring-influenced non-return valve disc being arranged to prevent passage of liquid through the said aperture when the piston is being displaced in the said reservoir under the action of its spring.

6. An apparatus as claimed in claim 4 further comprising an additional reservoir in the end of the body member remote from the end formed with said cylindrical recess, the reservoir containing the pressure piston and the said return conduit being arranged to open into said further reservoir.

CECIL BERTRAM JAMES.

REFERENCES CITED

The following references are of record in the file of this patent:

UNITED STATES PATENTS

| Number | Name | Date |
|---|---|---|
| 1,367,133 | Guillery | Feb. 1, 1921 |
| 2,297,778 | Knerr et al. | Oct. 6, 1942 |

FOREIGN PATENTS

| Number | Country | Date |
|---|---|---|
| 546,374 | France | Aug. 18, 1922 |
| 771,662 | France | July 30, 1934 |